United States Patent
Campagna

(10) Patent No.: US 8,909,804 B2
(45) Date of Patent: Dec. 9, 2014

(54) INTERFEROMETRIC PRECISE TIMING DISTRIBUTION WITH A PRECISION PHASE DETECTOR

(75) Inventor: David Paul Campagna, St Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 976 days.

(21) Appl. No.: 12/558,686

(22) Filed: Sep. 14, 2009

(65) Prior Publication Data
US 2011/0066740 A1 Mar. 17, 2011

(51) Int. Cl.
| G06F 15/16 | (2006.01) |
| H04J 3/06 | (2006.01) |
| G01C 3/00 | (2006.01) |
| G01C 3/08 | (2006.01) |
| G01B 11/02 | (2006.01) |
| G01B 9/02 | (2006.01) |
| H04B 10/00 | (2013.01) |
| G06F 1/12 | (2006.01) |
| H04L 7/00 | (2006.01) |

(52) U.S. Cl.
CPC ............. H04J 3/0682 (2013.01); H04L 7/0008 (2013.01)
USPC ............. 709/230; 356/3; 356/4.09; 356/512; 356/477; 356/498; 356/486; 398/153; 713/400

(58) Field of Classification Search
USPC ............ 356/3, 4.09, 512, 477, 900, 486, 498; 398/153; 709/230; 713/400
See application file for complete search history.

(56) References Cited

U.S. PATENT DOCUMENTS

| 4,234,971 | A | | 11/1980 | Lutes, Jr. | |
| 5,502,562 | A | | 3/1996 | Werle | |
| 5,781,295 | A | | 7/1998 | Fuchs et al. | |
| 5,784,161 | A | * | 7/1998 | Bechstein et al. | 356/487 |
| 5,966,258 | A | * | 10/1999 | Bliss | 360/46 |
| 6,115,825 | A | * | 9/2000 | Laforge et al. | 713/400 |
| 6,418,537 | B1 | * | 7/2002 | Yang et al. | 713/400 |
| 7,057,742 | B2 | | 6/2006 | Marron et al. | |
| 7,130,059 | B2 | | 10/2006 | Marron | |
| 7,161,128 | B2 | * | 1/2007 | Wirth | 250/201.9 |
| 7,414,728 | B2 | * | 8/2008 | Caplan | 356/477 |
| 2003/0012173 | A1 | * | 1/2003 | Rune | 370/344 |
| 2004/0186674 | A1 | * | 9/2004 | Hansen et al. | 702/79 |
| 2005/0220051 | A1 | * | 10/2005 | Lavean | 370/330 |

(Continued)

OTHER PUBLICATIONS

Lampton et al. , "A High-Speed Wide Dynamic Range Time-To-Digital Converter", Jul. 14, 1994, pp. 3577-3584, vol. 65, No. 11, Publisher: 1994 American Institute of Physics.

(Continued)

Primary Examiner — David Lazaro
Assistant Examiner — Vitali Korobov
(74) Attorney, Agent, or Firm — Fogg & Powers LLC

(57) ABSTRACT

A method distributing data in a network is provided. The method comprises measuring the path lengths between a reference clock and a plurality of remote destinations and sending a timing signal from the reference clock to the plurality of remote destinations. The method further comprises measuring the phase between the reference clock and a return signal from each of the plurality of remote destinations and adjusting the phase of the data such that each remote destination receives the data within a skew tolerance.

10 Claims, 9 Drawing Sheets

(56) References Cited

U.S. PATENT DOCUMENTS

| | | |
|---|---|---|
| 2005/0265406 A1 | 12/2005 | Kaertner et al. |
| 2006/0281416 A1* | 12/2006 | Hansen et al. ............. 455/67.16 |
| 2007/0086713 A1 | 4/2007 | Ingmar et al. |
| 2008/0024787 A1 | 1/2008 | Kaertner et al. |
| 2008/0043784 A1 | 2/2008 | Wilcox |
| 2009/0207418 A1* | 8/2009 | Kim et al. .................... 356/498 |

OTHER PUBLICATIONS

J. Kim et al., "An Integrated Femtosecond Timing Distribution System for XFELS", Jun. 29, 2006, Publisher: Research Laboratory of Electronics; Massachusetts Institute of Technology.

Kim et al., "Large-Scale Timing Distribution and RF-Synchronization for FEL Facilities", "Proceedings of the 2004 FEL Conference", Sep. 15, 2004, pp. 339-342.

* cited by examiner

INTERFEROMETRIC PRECISE TIMING DISTRIBUTION WITH A PRECISION PHASE DETECTOR

BACKGROUND

Optical interferometry is frequently used to measure extremely small distances. Conventional single wavelength interferometric measurement does not extend well beyond about one optical wavelength. Absolute Distance Interferometry (ADI) is a technique for measuring distances greater than one wavelength. Two interferometers, each operating at two or more wavelengths, are used in ADI. ADI calibrates measurements in an interferometer of unknown length by comparison with a reference interferometer of known length. ADI determines distances from the ratio of the phase change induced across multiple frequencies, which is proportional to the ratio of the interferometer lengths.

The optical path difference of an interferometer of unknown length, D, is compared with the optical path difference of a reference interferometer of known length, L, by illuminating both interferometers with the same laser and tuning the laser over a frequency interval, $\Delta f$. The phase change, $\Delta\Theta$, induced for the interferometer of unknown length, D, is given as:

$$\Delta\Theta = \frac{2\pi}{c} D \Delta f$$

where c is the speed of light. The phase change induced for the reference interferometer, $\Delta\Phi$, is given as:

$$\Delta\Phi = \frac{2\pi}{c} L \Delta f$$

The measured phase changes for both interferometers can be used to calculate the length, D, of the interferometer of unknown length:

$$D = L \frac{\Delta\Theta}{\Delta\Phi}$$

If the phase change exceeds $2\pi$, fringe counting must be applied in order to properly determine the total phase shift.

SUMMARY

In one embodiment, a method of distributing data in a network is provided. The method comprises measuring the path lengths between a reference clock and a plurality of remote destinations and sending a timing signal from the reference clock to the plurality of remote destinations. The method further comprises measuring the phase between the reference clock and a return signal from each of the plurality of remote destinations and adjusting the phase of the data such that each remote destination receives the data within a skew tolerance.

DRAWINGS

Figure 1:
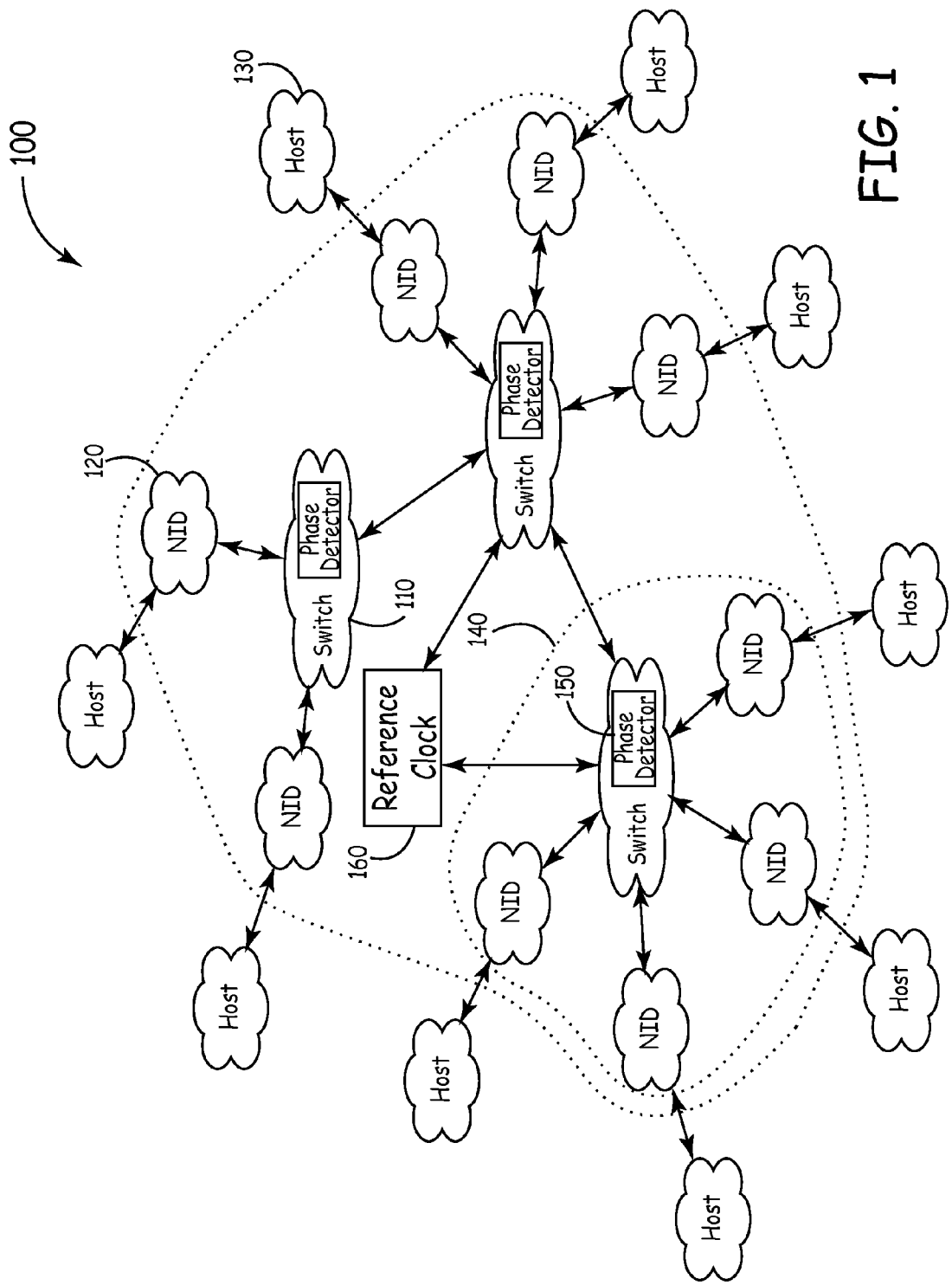
Figure 2:
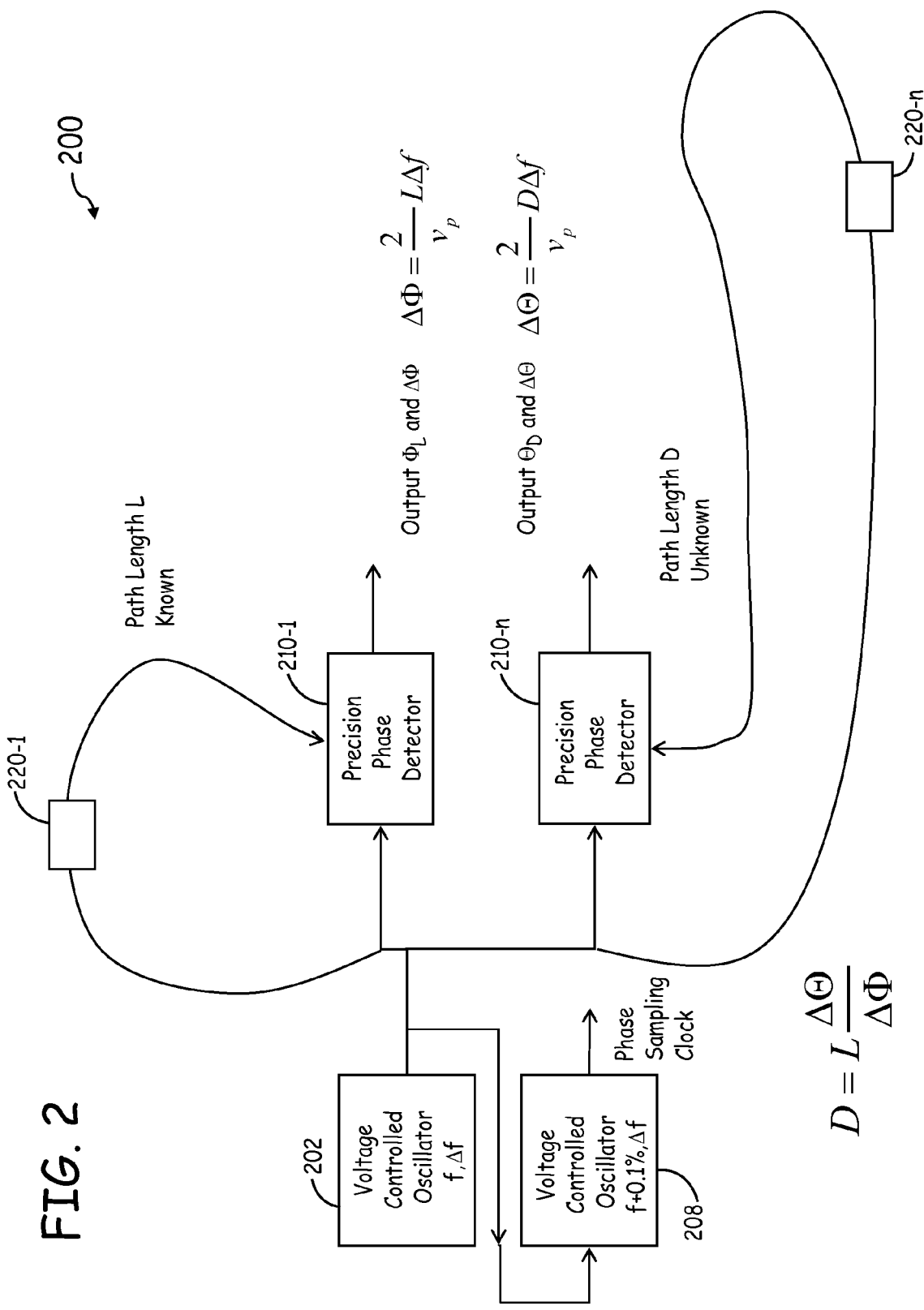
Figure 3:
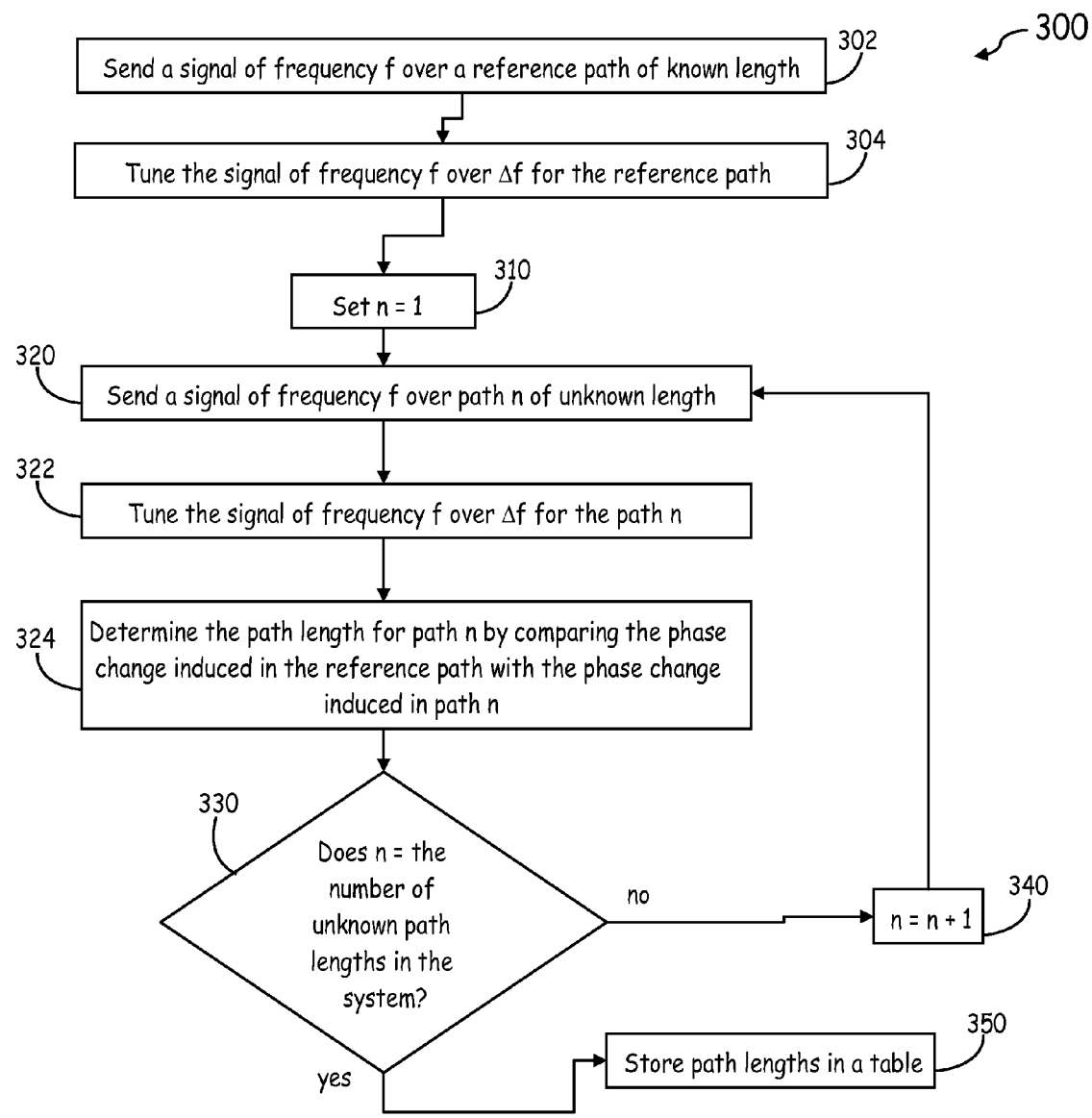
Figure 4A:
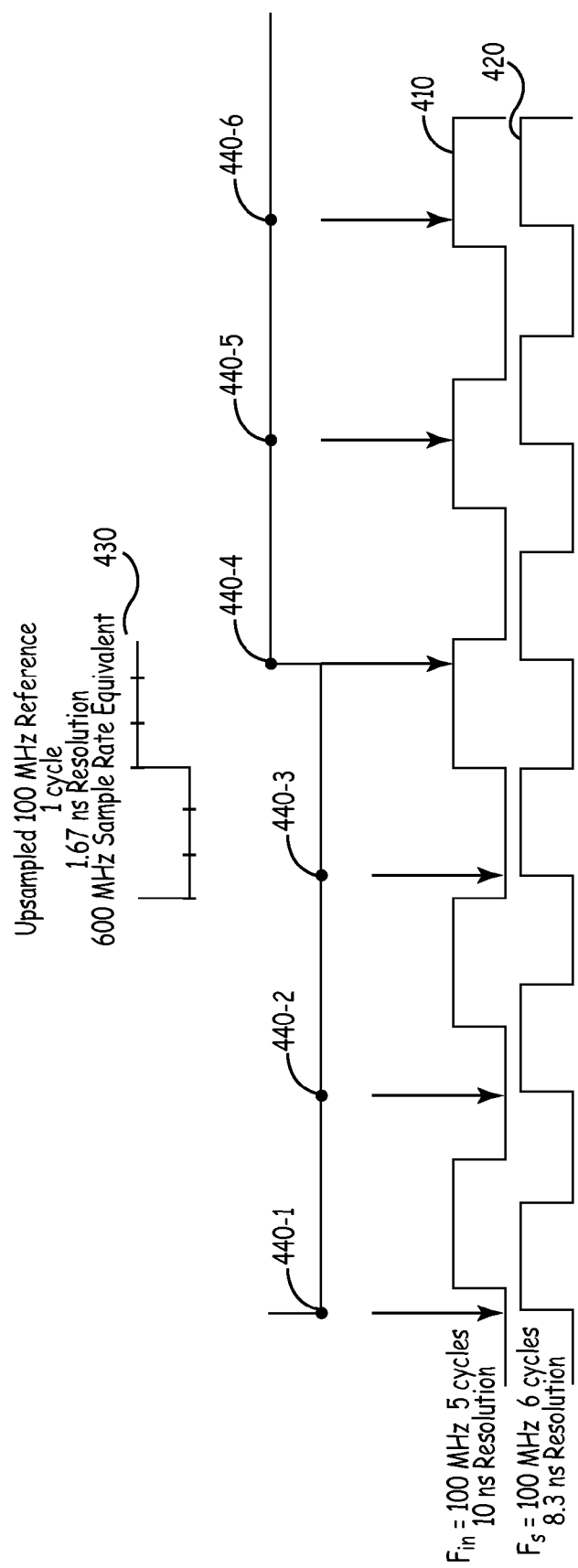
Figure 4B:
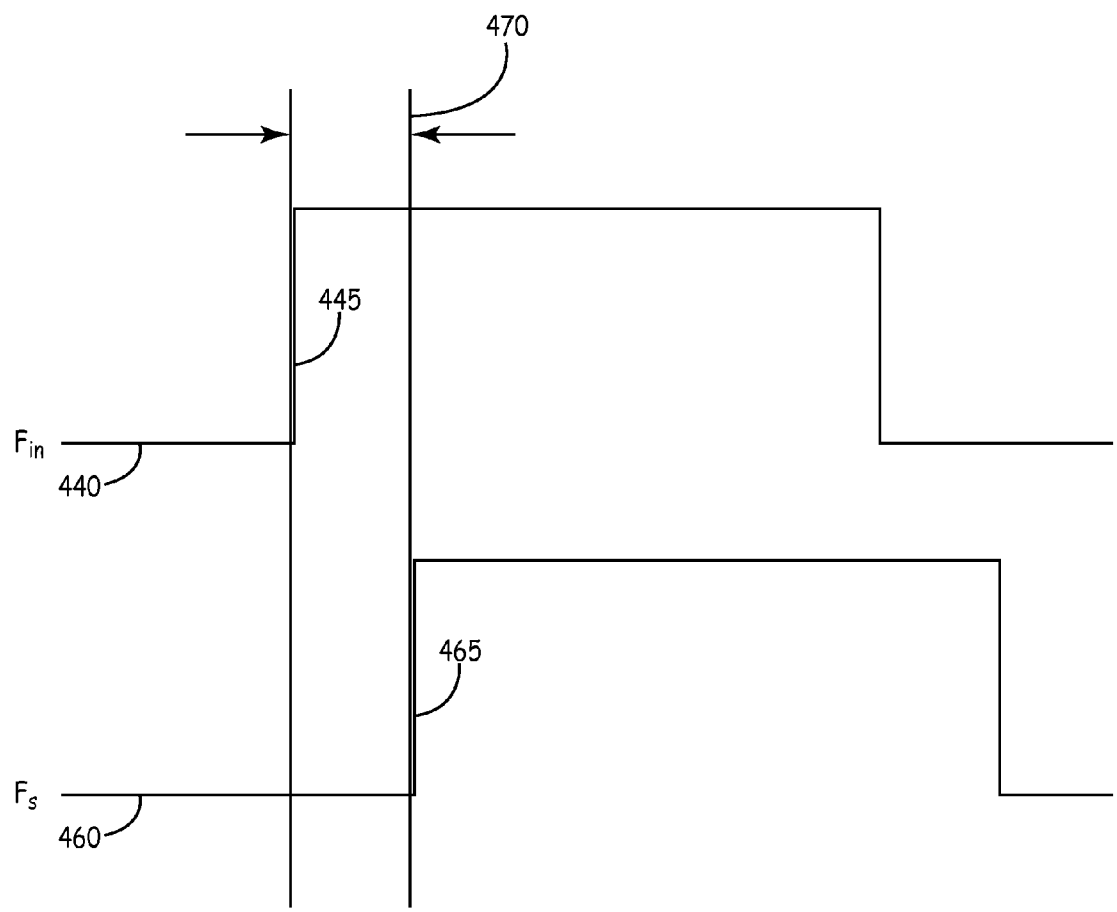
Figure 5:
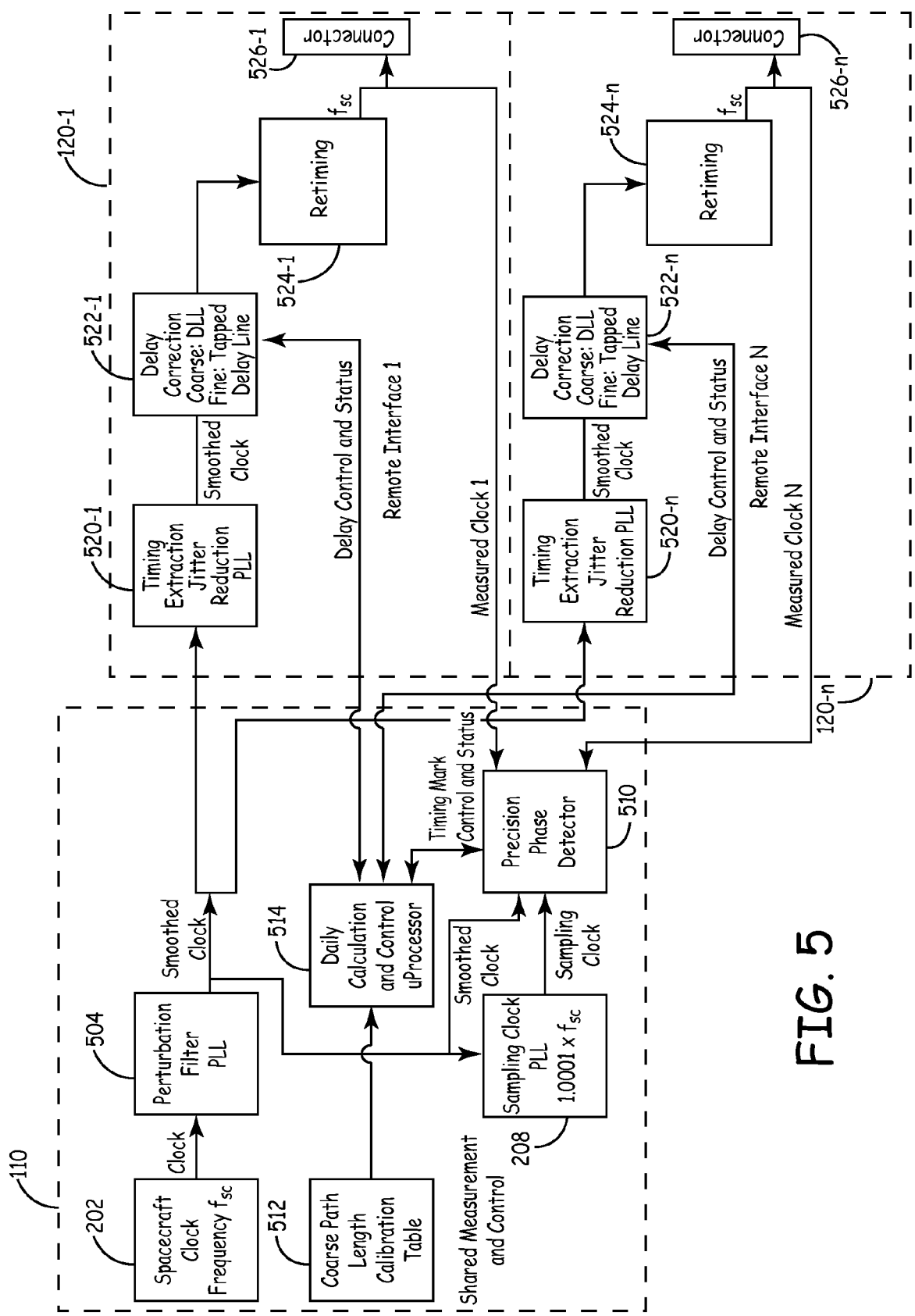
Figure 6:
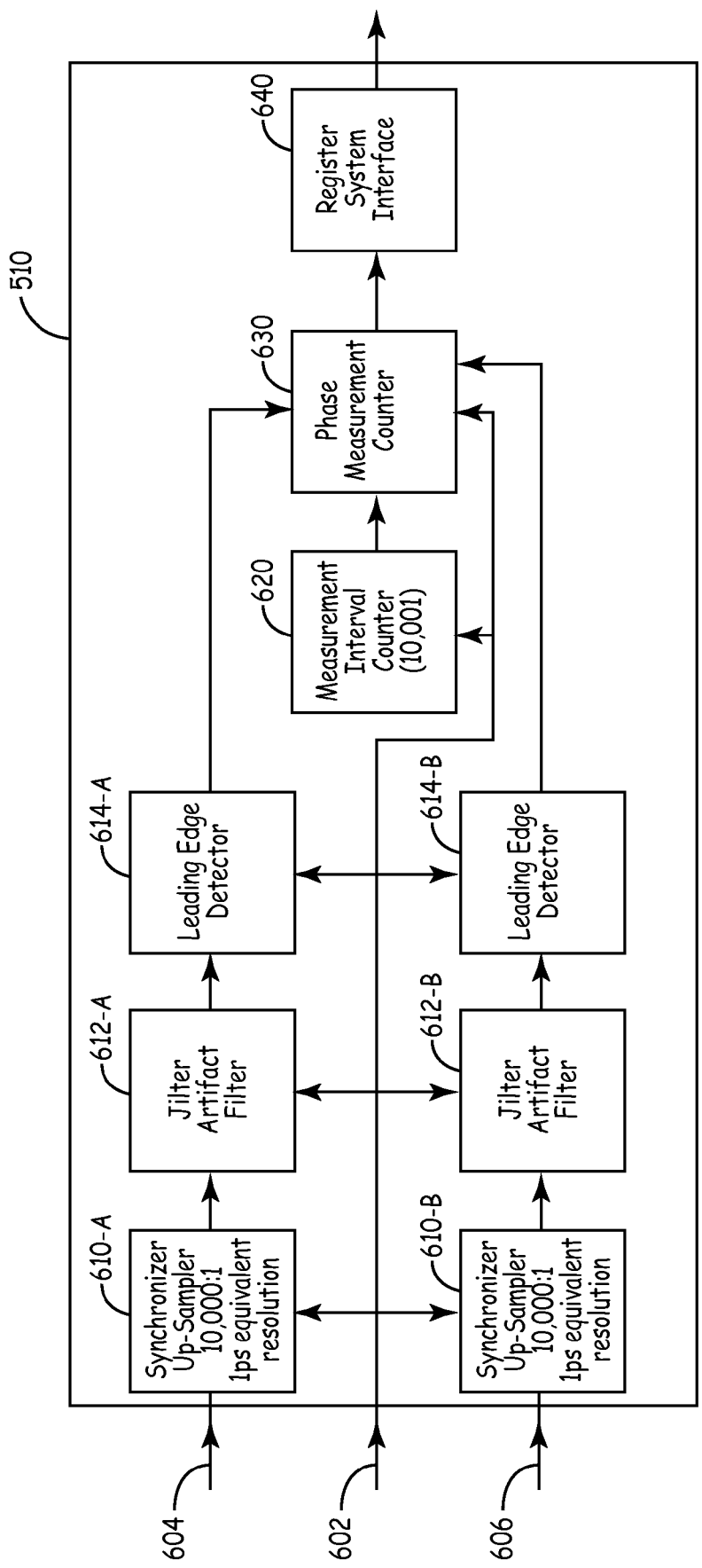
Figure 7:
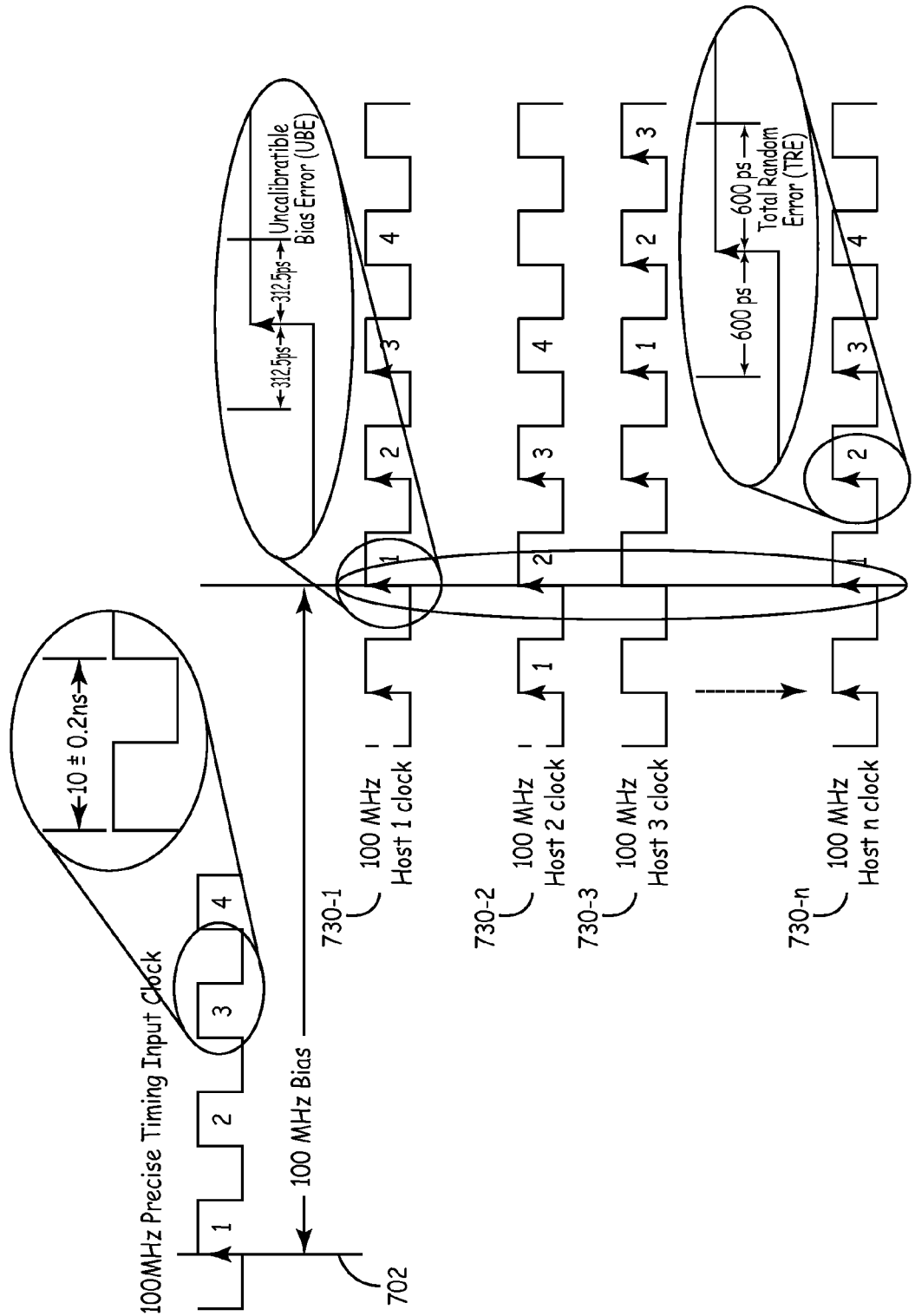
Figure 8:
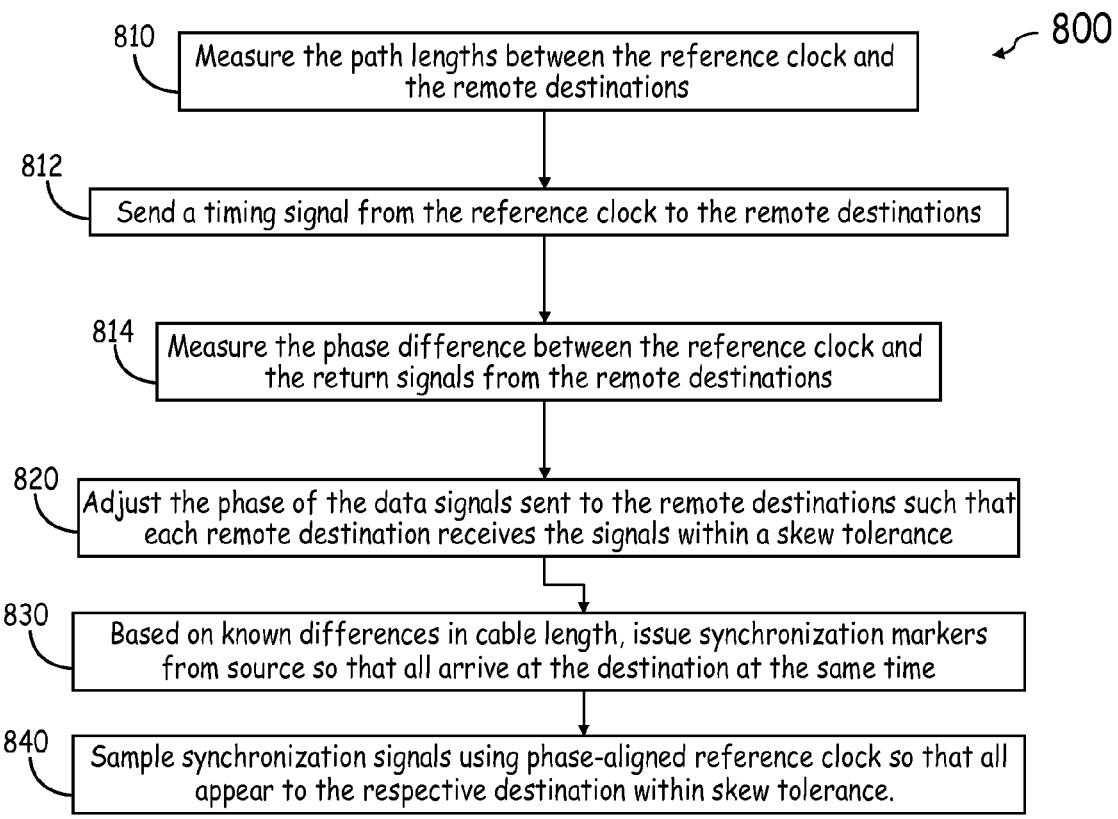

FIG. 1 depicts one embodiment of a network.
FIG. 2 illustrates Absolute Distance Interferometry adapted for one embodiment of a system.
FIG. 3 is one embodiment of a flowchart of a method for measuring path lengths using Absolute Distance Interferometry in a network.
FIG. 4A illustrates an embodiment of effective unsampling for precision phase detection.
FIG. 4B illustrates an embodiment of a reference signal and a delayed reference signal.
FIG. 5 depicts one embodiment of a subnet of a network.
FIG. 6 is a block diagram of one embodiment of a precision phase detector.
FIG. 7 illustrates one embodiment of clock timing requirements for a network.
FIG. 8 is a flowchart of one embodiment of a method for calibrating timing in a network.

In accordance with common practice, the various described features are not drawn to scale but are drawn to emphasize specific features relevant to exemplary embodiments. Like reference numbers and designations in the various drawings indicate like elements.

DETAILED DESCRIPTION

In one embodiment of the invention, one or more timing signals are distributed from a central source to an arbitrary number of destinations over an arbitrary transport medium with arbitrary propagation distance for each destination such that the signal transition skew between the timing signals at all the destinations is less than $\pm K$ picoseconds (ps), where K is a predetermined value, by adapting ADI to electrical/electro-optical systems. An embodiment of the invention is discussed where a single timing signal comprised of a 100 MHz square wave with 50% duty cycle is distributed with a desired skew limit of less than $\pm 312.5$ ps.

FIG. 1 depicts one embodiment of a network 100. The network 100 comprises a plurality of switches 110, a plurality of Network Interface Devices (NIDs) 120, a plurality of hosts 130, and a reference clock 160. The network 100 is a space network. As shown in FIG. 1, the NIDs 120 are electrically connected to a single switch 110 and a single host 130. Other configurations are contemplated. The NIDs 120 take data from a host 130 and "inject" it into the network 100. The NIDs 120 also receive data from the network 100 and make it available to a host 130. Additionally, the NIDs 120 receive synchronization signals from the switches 110 and provides the signals to the hosts 130.

The switches 110 include a phase detector 150. The phase detector 150 is operable to detect the phase of at least one signal. The switches 110 are connected to a plurality of NIDs 120 and to a plurality of other switches 110. The connections between the components in the network 100 can comprise cables, wires, optical fiber, circuit board traces, and the like. The length of the connections between components corresponds to the path length. A switch 110 receives data from a NID 120 or other switch 110 and routes it to other NIDs 120 or other switches 110. Routing is configurable so not all hosts 130 have to see all of the data in the network 100. The switches 110 can receive synchronization signals from the reference clock 160. The reference clock 160 acts as a master clock for the network 100. The reference clock 160 is shown external to and communicatively coupled with the switches 110. In alternative embodiments, the reference clock 160 is located within a switch 110. In another embodiment, the reference clock 160 is located external to the switches 110 and is communicatively coupled to a subset of the switches 110 in the network 100. The switches 110 distribute timing signals to NIDs 120 or other switches 110.

The network 100 can be reduced into subnets 140. Subnets 140 are composed of one switch 110 and those NIDs 120 that are connected to that switch 110. Each switch 110 and the NIDs 120 connected to that switch 110 form a subnet 140. Subnets 140 can be used to group physically or logically related hosts 130. The subnets 140 can be used to scale up very large networks. This open scalable architecture allows network 100 to adapt to different needs. In one embodiment, the size of subnets 140 is scalable to at least 32 ports.

The network 100 has a precise timing distribution which is described below. In one embodiment, the timing distribution provides synchronization signals with system-wide skew to less than 312.5 ps, achieved by utilizing a precise timing distribution. The network 100 requires clock and timing signals to be delivered to a plurality of remote destinations such that the clock skew across all the destinations is less than ±312.5 ps. In other words, each of the host interfaces in the plurality of NIDs 120 receives timing signals almost simultaneously (within a 312.5 ps skew threshold), while preserving timing relationships between the timing signals and the clock. In one embodiment, this skew control threshold is maintained over at least a 12 year life of network 100. The skew control threshold is also maintained through environmental factors, such as across a wide temperature range, voltage variations, a radiation total dose exposure of at least 100 kRads, and the like. Also, network 100 compensates for any path length variation for each of the links between the central source and a remote destination.

By adapting Absolute Distance Interferometry (ADI) to an electronic implementation instead of an optical implementation, it is possible to measure an effective signal path to a resolution of at least 4 ps. The equivalence between time and a particular distance depends on the propagation velocity, $v_p$, which is some fraction of the speed of light for any medium other than free space.

FIG. 2 illustrates Absolute Distance Interferometry adapted for one embodiment of a system 200. Using ADI, an unknown path length can be determined using a known path length. The system 200 includes a clock source 202, a sampling clock 208, a plurality of phase detectors 210, and a plurality of NIDs 220.

The system 200 incorporates an electrical implementation of ADI. Each loop between a phase detector 210 and an NID 220 and back again functions as an interferometer. ADI is used to measure an interferometer of unknown length by comparison with a reference interferometer of known length. ADI determines distances from the ratio of the phase change induced on the unknown path length with the phase change induced over the known path length.

The clock source 202 can output a spacecraft clock frequency, $f_{sc}$, which functions as the master clock. In other words, the spacecraft clock is the central timing source. In one embodiment, $f_{sc}$ is 100 MHz. Sampling clock 208, discussed below, outputs a signal slightly faster than that of clock source 202. This outputted signal is denoted as $f_f$. Both $f_{sc}$ and $f_f$ are inputted into the plurality of phase detectors 210.

Two NIDs 220 are shown, 220-1 and 220-n, in FIG. 2. In this example, the NID 220-1 corresponds to the reference interferometer. However, the reference interferometer could be something besides an NID, for example, the reference interferometer could also be a trace on a circuit board. The path length for the reference interferometer NID 220-1 is known, and is denoted L. The path length for interferometer NID 220-n is unknown, and is denoted D.

The system 200 is implemented into the network 100. The network 100 is a space network. One embodiment of system 200 is implemented into a field-programmable gate array (FPGA). Another embodiment of system 200 is implemented into an application specific integrated circuit (ASIC).

The theory of operation of optical interferometry starts with light from a laser source being split into two beams. The first beam, referred to herein as beam R, travels in what is called the reference arm of the interferometer. Beam R travels to a mirror, is reflected by the mirror, and travels to a photo detector. The second beam, referred to herein as beam M, acts as the measurement beam and travels to a target where beam M is reflected back to the photo detector. The optical signals can be represented mathematically as sinusoids. The path length for the reference path, R, is given as $R=I_R \cos(2\pi f)$, and the path length for the measurement path, M, is given as $M=I_M \cos(2\pi f+\Theta_M)$. $\Theta_M$ is the additional phase associated with the difference in optical path length between the reference path and the measurement path.

Since the light source is a laser, the two signals can be assumed to be coherent. Thus, the output of the photo detector is proportional to $\cos(\Theta_M)$. The periodicity of the cos function limits unambiguous distance measurement to the range $-\pi/2$ to $\pi/2$, half the optical wavelength, $\lambda$. Modifications can be made to extend the range to $-\pi$ to $\pi$, one optical wavelength, $\lambda$, after which fringe counting can extend the measurement range to many wavelengths.

In one embodiment, a 100 MHz square wave is split into reference and measurement signals and is meant to have a skew of less than ±312.5 ps. The reference signal is routed to a precision phase detector and the measurement signal travels to a target destination. A portion of the signal at the destination is sampled and returns to the precision phase detector where the phase difference between the returned measurement signal and the reference signal is determined to high precision. Like an optical phase detector, the precision phase detector can only measure phase over one wavelength. The wavelength depends on the transmission medium, but in this embodiment, the time equivalent is 10 ns or one period of the 100 MHz signal. In order to meet the skew requirement for this embodiment, the precision phase detector must be able to measure the phase to better than one part in 32 (10 ns/312.5 ps).

Since the distance each signal can travel to reach the destination is not constrained, it is possible for the phase differences between the reference and the measured signal at the precision phase detector to exceed $2\pi$ (10 ns). This phase difference is determined by the system configuration and must be calibrated out. The approach selected in this embodiment is to use ADI as applied to on electrical system.

In another embodiment using ADI, a Voltage Controlled Oscillator (VCO) functions as the tunable laser described above. The VCO is designed to oscillate at the reference frequency of 100 MHz, but to be tunable across a range of frequencies around 100 MHz. A precision phase detector functions as the photo detector described above. The precision phase detector is used to achieve phase measurement resolution requirements. The precision of the precision phase detector is driven by the need to accurately measure the phase change in the reference interferometer. The reference interferometer for ADI is fed by the VCO. The reference interferometer paths are defined by traces on a printed circuit board (PCB) and are tightly controlled and known.

FIG. 3 is a flowchart of one embodiment of a method 300 for measuring path lengths using ADI in a network. Method 300 begins at block 302 where a calibration signal of frequency f is sent through the reference path of known length, L. For example, in FIG. 2, the reference path corresponds to the path for NID 220-1. At block 304, the calibration signal transmitted through the reference path is tuned over a frequency interval, $\Delta f$.

The method 300 proceeds to block 310 where n is set equal to 1, corresponding to the first unknown path length, D. For example, the first unknown path length, D, corresponds to NID 220-2. Method 300 enters a loop at block 320. At block 320, a calibration signal of frequency f is sent through the path of unknown length, D. At block 322, the calibration signal transmitted through the path is tuned over a frequency interval, $\Delta f$. At block 324, method 300 determines the path length D for an $n^{th}$ NID. D is determined by comparing the phase changes of the $n^{th}$ NID and the reference. The phase change induced for the interferometer of unknown length is given as:

$$\Delta \Theta = \frac{2\pi}{v_p} D \Delta f$$

The phase change induced for the reference interferometer is given as:

$$\Delta \Phi = \frac{2\pi}{v_p} L \Delta f$$

The measured phase changes can be used to calculate the length of the $n^{th}$ interferometer:

$$D = L \frac{\Delta \Theta}{\Delta \Phi}$$

Once the path length for the $n^{th}$ path is calculated, the method 300 queries whether n equals the number of unknown path lengths in the system at block 330. In other words, the method 300 asks if there is another NID with an undetermined path length. If there are more path lengths to be determined, the method 300 proceeds to block 340. At block 340, n is incremented by 1. Then the method 300 repeats the loop starting at block 320.

Once all the unknown path lengths are determined, the method 300 proceeds to block 350. At block 350, the determined path lengths for all the paths are stored in a database, such as a table. The path lengths can be stored in a memory (not shown). The memory can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link. In another embodiment, once all the unknown path lengths are determined, the method 300 ends without storing path lengths.

In one particular embodiment of the reference interferometer, the reference path is 1 inch and the measurement path is 12 inches. The total reference interferometer length for ADI is 11 inches. The measurement interferometer is also fed by the VCO and implements a precision phase detector. For the measurement interferometer, the path length of the reference arm is 1 inch and the measurement arm is 360 inches (30 ft). The total measurement interferometer length, D, is 359 inches and represents the quantity to be estimated using ADI. The propagation velocity, $v_p$, for all paths is assumed to be 0.8 ft/ns. Let VCO frequency 1=100 MHz, frequency 2=105 MHz, therefore $\Delta f$=5 MHz.

TABLE 1

| | |
|---|---|
| $\Phi_R$ for 100 MHz | 1.1458333 ns = 41.25 degrees |
| $\Phi_R$ 105 MHz | 43.31248 degrees |
| $\Delta \Phi$ | 2.06248 degrees |
| $\Theta_M$ for 100 MHz | 37.3958333 ns = 1346.250 degrees |
| $\Theta_M$ for 105 MHz | 1413.5625 degrees |
| $\Delta \Theta$ | 67.3125 degrees |

Table 1 provides one set of exemplary experimental data for this embodiment. The results for the distance to the destination, D, is calculated as:

$$D = 11 \text{ inches} * \frac{1413.5625 \text{ deg}}{43.31248 \text{ deg}} = 359.0001 \text{ inches}$$

From the above example, the phase change in the reference interferometer across the frequency sweep of 100 to 105 MHz and $\Delta f$=5 MHz is about 2 degrees. This corresponds to one part in 180 of a single cycle at 105 MHz, which is equivalent to 52 ps effective sampling period across the 105 MHz waveform cycle. In one embodiment, the precision phase detector can detect phase changes down to 1 ps or 0.04 degrees. With this f and $\Delta f$, measurement of interferometer lengths greater than about 160 ft will require additional phase counting circuitry to accommodate $\Delta \Theta$ greater than 360 degrees.

Therefore, using ADI and FSI, the path lengths from the reference clock source 202 to a host interface on the plurality of NIDs 220 are determined. Using ADI is advantageous because it can be used to measure phase at or near the host interfaces in NIDs 120. In one embodiment, ADI can establish 100 MHz reference timing. ADI can also be used to reduce integration calibration needed for network 100. Continuous monitoring of the path lengths compensates for temperature, voltage, process variations, aging, and radiation. In one embodiment, ADI is used to make closed loop skew corrections and to confirm skew adjustments. ADI can also be used to report timing degradation of space network 100.

A significant challenge to implementing an interferometric precise timing distribution for space applications is the development of a precision phase detector circuit that can meet the performance requirements and be implemented in radiation hardened logic. Embodiments of the precision phase detector rely on the periodic nature of the timing signal to achieve picosecond sampling resolution. The precision phase detector creates a sampling clock signal that is phase locked to a subharmonic of the input timing signal. In one embodiment, this timing signal is a 100 MHz square wave. The choice of subharmonic determines the precision of the phase detector. In one embodiment, the chosen subharmonic is 10 kHz for a 100 MHz input signal. This results in a phase detector precision of one part in 10,001 or about 1 ps.

In embodiments of the precision phase detector, $F_s=(N2/N1)*F_{in}$, where the sampling frequency, $F_s$, is slightly greater than the frequency of interest, $F_{in}$. This embodiment deliberately does not meet the Nyquist criterion for stability in a closed-loop control system for sampled data systems, namely that $F_s \geq 2*F_{in}$. In one embodiment, N2 and N1 are specifically chosen integers that have no common factors and are consecutive, for example N2=10,001, N1=10,000.

FIG. 4A illustrates an embodiment of effective upsampling for precision phase detection comprising a reference signal 410 and a sampling clock 420. The reference signal 410, $F_{in}$, is 100 MHz at 10 ns resolution, with N1=5. The delayed reference signal 420, $F_s$, is 120 MHz at 8.3 ns resolution, with N2=6. The net effect of the chosen integers for the frequency multiplication ratio is illustrated in FIG. 4A. What the choice of N2 and N1 given above means in practice is that 6 sampling cycles will occur for every 5 cycles of the reference signal $F_{in}$. In one exemplary embodiment, values of 10,001 and 10,000 are used. In one embodiment, the signal of interest is a highly frequency stable square wave signal with $F_{in}$=100 MHz.

Exactly 6 cycles of $F_s$ occur for every 5 cycles of $F_{in}$. Points 440-1 through 440-6 indicate a point on the waveforms 410 and 420 that sampling takes place. When sampling 440 takes place at the rising edge of $F_s$ 420, each sample 440 occurs at a different position on the $F_{in}$ waveform 410. Since these two waveforms are phase locked at a sub-multiple, in this case 20 MHz, this sampling pattern repeats exactly every 5 cycles of $F_{in}$. Assuming $F_{in}$ 410 does not change from cycle to cycle over the 5 cycles sampled here, the resulting 6 samples can be interpreted as a single cycle of $F_{in}$ 410 sampled at a much higher effective frequency than $F_s$ 420, in this case $6F_s$. A significant advantage of this implementation is that all of the circuitry need only operate at the $F_s$ rate, a rate achievable by 150 nm radiation hardened by process technology. For example, the sampling rate in FIG. 4A is equivalent to sampling a 600 MHz signal 430, which has a 1.67 ns resolution. For comparison, a logic operating at 500 GHz achieves a 2 ps sampling interval.

FIG. 4B illustrates an embodiment of a reference signal 440, $F_{in}$, and a delayed reference signal 460, $F_s$. A precision phase detector samples two signals of the same frequency and different phases in order to determine with picosecond precision what their phase difference is. By beginning a measurement at the first rising edge of the reference signal 445 and ending it at the rising edge of the delayed reference signal 465, the precision phase detector will effectively take equally spaced samples in the region between the rising edge 445 and the rising edge 465. The ratio of the number of samples taken over the total number of samples in a measurement interval 470 (defined by N2) can be interpreted as a measure of the phase relationship between the two waveforms.

Since the precision phase detector is phase locked loop based, it is well suited to making the required measurements for absolute difference interferometry. As the reference frequency goes from $f_1$ to $f_2$, the PLL will adjust $F_s$ such that there will always be exactly N2 measurements in the measurement interval. The measurement precision will increase as the reference frequency goes up, but the fundamental operation and the validity of the measurements remains unchanged across the range from $f_1$ to $f_2$.

FIG. 5 depicts one embodiment of a subnet 140 of network 100. As shown, subnet 140 includes a switch 110 and a plurality of NIDs 120-1 through 120-n. Switch 110 and NIDs 120 are discussed in the context of their timing distribution function. However, it is contemplated that switch 110 and NIDs 120 perform other functions as well, such as data transfer, and each NID 120 is responsible for adjusting the skew of their respective precise timing signals under the control of the central timing control.

In one embodiment, the switch 110 includes at least a clock source 202, perturbation filter 504, sampling clock 208, precision phase detector 510, coarse path length calibration table 512, and delay calculation and control microprocessor 514. The microprocessor 514 delays signals sent to the remote destinations based on the values of the path lengths stored in the database. Clock source 202 can output a clock frequency, $f_{sc}$, which functions as the central source. Clock source 202 outputs a spacecraft clock frequency. In one embodiment, $f_{sc}$ is 100 MHz. Clock source 202 outputs master timing signals to the perturbation filter 504.

Perturbation filter 504 is a phase lock loop (PLL) control system. A PLL generates a signal that has a fixed relation to the phase of a reference signal, thus locking the frequency of the output to the frequency of the input. In switch 110, perturbation filter 504 functions to filter out jitter. The perturbation filter 504 receives reference signal $f_{sc}$, filters out any clock jitter, and outputs a smoothed signal, smoothed $f_{sc}$. The smoothed $f_{sc}$ is the timing signal for subnet 140. Perturbation filter 504 outputs smoothed $f_{sc}$ to the sampling clock 208 and the precision phase detector 510.

Sampling clock 208 is also a phase lock loop (PLL) control system. Sampling clock 208 generates an output signal (a sampling clock signal $f_f$) which is slightly faster than the input signal $f_{sc}$. As discussed above, generating a signal a bit faster than the input signal aids in the measurement of the phase difference between the source clock and the signals returning from the NIDs 120 (the return signals). In one embodiment, the frequency of the sampling clock, $f_f$, is $1.0001f_{sc}$. For example, if $f_{sc}$ is 100 MHz, $f_f$ is 100.01 MHz. Sampling clock 208 outputs $f_f$ to precision phase detector 510.

In one embodiment, the precision phase detector 510 receives $f_{sc}$, $f_f$, a timing mark control and status signal from microprocessor 514, and measured clock signals 1 through n for each of the NIDs 120. The precision phase detector 510 measures the phase difference between these signals.

The plurality of NIDs 120 include a timing extraction jitter reduction PLL 520, delay correction 522, retiming device 524, and connector 526. The PLL 520 extracts timing signals and reduces jitter. For example, with respect to NID 120-1, the PLL 520-1 receives the smoothed clock signal $f_f$ from the PLL 504. The smoothed clock signal is inputted into delay correction 522-1.

Delay correction 522-1 is a compensated delay line used to calibrate signal timing. The delay correction 522-1 has a delay lock loop (DLL) for making coarse adjustments to the phase and a tapped delay line for making fine adjustments to the phase. The tapped delay line is capable of control over approximately 70 to 100 ps. The tapped delay line is a 50 ps/tap, 8-tap temperature, voltage, and process compensated precision delay line for making fine phase adjustments. The temperature, voltage, and process compensation reduces any variation in the delays across each tap.

The DLL in delay correction 522-1 is used to make coarse adjustments to the timing. In one embodiment, the DLL is capable of control over approximately 350 to 400 ps. The DLL is operable to continuously monitor and make precise delay line adjustments to stabilize the overall phase front. The DLL can be configured to delay a cycle by any percentage of the cycle that is desired. The delay could be as large as several percent. The DLL is used to make approximately 312 ps/bit, 5-bit adjustments at 100 MHz.

The retiming device 524-1 outputs $f_{sc}$ to the controller 526-1 and to the phase detector 510. The signal received at the phase detector 510 is the measured return signal (from the NID) whose phase is compared to the smoothed signal $f_{sc}$. The controller 526-1 is used to connect NID 120-1 to a host 130.

FIG. 6 is a block diagram of one embodiment of a precision phase detector 510. The precision phase detector 510 (also referred to herein as a phase detector) comprises a pair of synchronizer up-samplers 610, jitter artifact filters 612, and leading edge detectors 614. There are three signal inputs into the phase detector 510. These include a sampling clock signal 602, a reference signal 604, and a measurement signal 606 from the path to be measured (for example, the path to and from an NID). The master clock signal 602 is inputted into a measurement interval counter 620 which counts the clock signals, and is then inputted into a phase measurement counter 630.

The reference signal 604 is inputted to the up-sampler 610-A, which is combined with the master clock signal 602 and inputted into the jitter filter 612-A. The filter signal is then inputted into a leading edge detector 614-A. A signal for the detection of the leading edge is inputted into the phase measurement counter 630. A similar process is done for the measurement signal 606.

The phase measurement counter 630 determines the phase of each of the signals. This is outputted into a register system interface 640, which is outputted to the network (for example, to a switch). It is the detection of the signals' phase which enables the network to create the precise timing distribution.

FIG. 7 illustrates one embodiment of clock timing requirements for the network 100. The network 100 distributes a 100 MHz signal from precise timing input clock 702 to the NIDs 120. The signal that the clock 702 outputs is $f_{sc}$. Each of the plurality of hosts 130 have a clock 730 which receives $f_{sc}$ from the clock 702.

In one embodiment, clocks 730 in hosts 130 receive the 100 MHz signal, $f_{sc}$, all within at most 312 ps of each other. In order to achieve this timing precision, the network 100 must overcome at least two forms of error which may cause the signals to not be received simultaneously across the network 100, total random error (TRE) and uncalibratible bias error (UBE). TRE is error caused by fast random effects like the noise inherent in electronics, such as clock jitter. UBE is error that cannot be calibrated out, and includes errors resulting from slowly varying random effects like temperature, voltage, process, aging and radiation degradation.

As shown in FIG. 7, the rising edge of each clock pulse in the clocks 730-1 through 730-n all occur within 312 ps of each other. Calibration of the timing system brings the clocks 730 into effective alignment. Effective alignment means that while the clock edges do not have to match exactly, they are within a minimum skew threshold of each other. In one embodiment, $f_{sc}$ acts as a timing signal.

The network 100 must meet at least one of three phase adjustment requirements in order to adjust reference clock phase at the NIDs. First, the effective distance from the reference source $f_{sc}$ to the host interface on the NID 120 must be known. Or, secondly, the network must be able to unambiguously measure the reference clock phase at the host interface on each NID. Or, thirdly, the network must know the phase of the signals from calibration and measurements at integration.

FIG. 8 is a flowchart of a method 800 for calibrating timing in a network. Corrections to the timing can be made by calibrating the space network. The method 800 begins at block 810 where path lengths between the reference clock (which may be a switch) and the host interface on the NIDs are measured at integration of the network. Knowing the time it takes a signal to reach an NID from the source, termed the forward path, allows phase corrections to be made. The path lengths are needed in order to know the time the signal takes to propagate. The return path from the NID to the phase detector contributes extra information. Path lengths can be measured in a variety of ways. FIG. 3 showed how path lengths can be measured using ADI, or specifically using FSI.

Another method of measuring the path lengths is by physically taking a length measurement with a measuring device, such as a ruler. If all path lengths are roughly equal, within approximately 1.5 feet, measuring a single cycle of phase is sufficient to establish absolute time across all NIDs. A single measurement at integration can be stored in a lookup table. In one embodiment, length measurements are stored in a coarse path length calibration table. These stored measurements are sufficient to remove phase ambiguity. In one embodiment, the network has path lengths relatively close in length (for example, the path lengths are all within 5 ns of each other), so coarse length measurements are sufficient. For example, knowing the path lengths to one inch (corresponding to 83 ps) allows the network to establish a precise phase front for the precision timing clock at the NIDs. For example, if the path lengths do not vary by more than 1.5 ft, the phase of the signals is not ambiguous because the signals between the NIDs can not vary by more than one period. If the path lengths vary by more than 1.5 ft, the path lengths can be measured and stored in a table.

By determining the phase of the signals received at the NIDs (the remote signals) with respect to a local reference signal, the effective propagation delay from the source to each remote destination (the NIDs) can be determined. The remote signals can be brought into phase alignment per the requirements of the network by adjusting, or effectively adjusting, the respective path lengths from the source to each of the destinations.

In one embodiment, the method 800 takes continuous measurements of each of the remote signals and compares their phases with respect to the reference signal, $f_{sc}$. This continuous measurement enables the network to determine when the signals are all in alignment and to preserve that alignment across temperature, voltage, aging, radiation, and other effects.

Once the path lengths are determined, the method 800 proceeds to block 812. A timing signal is transmitted from the reference clock to the plurality of remote destinations at the block 812. The phase difference between the reference clock signal and the timing signal returned from the remote destinations (the return signal) is measured at block 814.

At block 820 the reference clock at each remote destination, namely the host interface on the NID, must be phase-aligned to meet timing specifications. Aligning the phase can be done by changing transmission parameters or by physically adjusting path lengths. One way of changing transmission parameters is to use the delay correction 522-1 in the NID 120-1 of FIG. 5. The delay correction 522-1 has a DLL for making coarse adjustments and a tapped delay line for making fine adjustments to the phase. Both coarse and fine adjustments can be made to the phase.

In one embodiment, a single set of adjustments is reliably achieved by implementing the method 800 upon initialization of the network. This set of adjustments can be applied each time the network is initialized, so calibration is not required every time the network is turned on. In another embodiment, a single phase solution is found for any subnetworks within the network.

The method 800 proceeds to block 830 where the clock signals are sampled using a phase-aligned reference clock so that all signals appear at the plurality of hosts 130 at within a skew tolerance. The signals may arrive within a skew tolerance of approximately half the reference clock period. In one embodiment, the signals arrive within 312 ps of each other. In one embodiment, a portion of the timing skew budget is allocated to the alignment of all the switches relative to each other.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Features described with respect to one embodiment may be combined with or replace features described in other embodiments. Therefore, it is manifestly intended that this invention be limited only by the claims and the equivalents thereof.

What is claimed is:

1. A method of distributing data in a network, comprising:
    measuring path lengths of physical connections between a reference clock and a plurality of remote destinations, the physical connections comprising a cable, a wire, an optical fiber, or a circuit board trace, wherein measuring the path lengths comprises:
        sending a calibration signal of a first frequency over a reference path of known length;
        tuning the calibration signal of a first frequency over a frequency interval while sending the calibration signal over the reference path;
        sending the calibration signal of a first frequency over a plurality of paths of unknown lengths for the physical connections;
        tuning the calibration signal of a first frequency over a frequency interval while sending the signal over the plurality of paths; and
        determining the path lengths for the plurality of paths by comparing the phase change induced in the calibration signal in the reference path with the phase change induced in the calibration signal in the plurality of paths;
    sending a timing signal from the reference clock to the plurality of remote destinations through the physical connections;
    measuring a phase difference between the timing signal from the reference clock and a return signal from each of the plurality of remote destinations; and
    adjusting the phase of the signals such that each remote destination receives the data within a skew tolerance.

2. The method of claim 1, further comprising:
    repeatedly measuring the path lengths between the reference clock and the plurality of remote destinations.

3. The method of claim 1, wherein the path lengths are measured to a resolution of at least 4 ps.

4. The method of claim 1, wherein measuring the path lengths further comprises measuring the path lengths with a measuring device.

5. The method of claim 1, wherein measuring the path lengths utilizes frequency scanning interferometry.

6. The method of claim 1, wherein the skew tolerance is less than ±312.5 ps.

7. The method of claim 1, wherein adjusting the phase of the data such that the data received at each remote destination are received within a skew tolerance further comprises:
    making coarse adjustments to the phase of the data at the plurality of remote destinations using a delay lock loop; and
    making fine adjustments to the phase of the data at the plurality of remote destinations using a tapped delay line.

8. The method of claim 1, wherein adjusting the phase of the data such that the data received at each remote destination are received within a skew tolerance comprises:
    adjusting the path length.

9. The method of claim 1, further comprising:
    storing values for the path lengths in a database.

10. The method of claim 8, further comprising:
    a processor to delay data sent to the plurality of remote destinations based on the values of the path lengths stored in the database.

* * * * *